United States Patent [19]

Lang et al.

[11] Patent Number: 4,489,305

[45] Date of Patent: Dec. 18, 1984

[54] MONITOR FOR HYDRAULIC TRANSMISSION

[75] Inventors: Stephen P. Lang, Waterloo; Yolanda E. Martin, Cedar Falls; Patrick E. Pinkston, Traer; Kanaparty N. Rao, Cedar Falls, all of Iowa

[73] Assignee: Deere & Company, Moline, Ill.

[21] Appl. No.: 379,230

[22] Filed: May 17, 1982

[51] Int. Cl.³ .................. B60Q 1/00; G08B 23/00
[52] U.S. Cl. .................. 340/57; 340/52 R; 340/60; 340/501; 340/588; 340/591; 340/611; 340/626; 340/670; 340/679; 180/179; 180/282
[58] Field of Search ............ 340/501, 57, 60, 59, 340/588, 589, 591, 596, 611, 614, 626, 670, 679; 180/170, 175–179, 282

[56] References Cited

U.S. PATENT DOCUMENTS

| | | | |
|---|---|---|---|
| 3,893,108 | 7/1975 | McBride, Jr. et al. | 340/52 F |
| 3,906,437 | 9/1975 | Brandwein et al. | 340/27 |
| 3,927,390 | 12/1975 | Hill | 340/52 F |
| 3,944,969 | 3/1976 | Arai et al. | 340/52 F |
| 4,184,146 | 1/1980 | Fratzke et al. | 340/52 F |
| 4,216,524 | 8/1980 | Leveraus | 362/61 |
| 4,328,480 | 5/1982 | Keitel et al. | 340/52 F |
| 4,348,653 | 9/1982 | Tsuzuki et al. | 340/58 |
| 4,359,716 | 11/1982 | Miyamaru et al. | 340/626 |

Primary Examiner—Donnie L. Crosland

[57] ABSTRACT

A vehicle, such as an agricultural tractor, includes a hydraulic assist-type transmission with fluid control and lubricating circuits. A monitoring system senses the fluid pressure in the lubricating circuit, the hydraulic fluid temperature and the engine speed. The sensed pressure is compared to a temperature and engine speed-compensated alarm value. Alarm signals are generated when the sensed pressure is continuously below the alarm value for a certain period. The alarm is disabled when the engine speed falls below a non-zero threshold level.

2 Claims, 4 Drawing Figures

MONITOR FOR HYDRAULIC TRANSMISSION

BACKGROUND OF THE INVENTION

This invention relates to a monitoring system for a hydraulic system and, in particular, a hydraulically actuated and lubricated vehicle transmission.

It is now possible, due to microprocessor technology, to monitor various vehicle operating parameters according to complex criteria. For example, a clutch monitoring system is described in copending U.S. application, Ser. No. 378,703, filed May 17, 1982, a filter monitoring system is described in copending U.S. application, Ser. No. 378,703, filed May 17, 1982 and an engine oil pressure monitoring system is described in copending U.S. application, Ser. No. 378,704, filed May 17, 1982, all assigned to the assignee of the present invention. However, none of these monitoring systems provide an indication of the condition of the hydraulic fluids in a hydraulic-assist type transmission. Heretofore, typical vehicle function monitoring systems have included sensors, such as pressure-actuated switches, which energize warning devices when undesirable conditions, such as low hydraulic pressures, occur in the function being monitored. The electrical circuits of such monitoring systems have often been coupled to the vehicle ignition switch so that warning signals cannot be generated unless the ignition switch is in a certain condition. However, such systems can produce misleading warning signals when low system pressures are caused merely by low engine speeds and not by any system failure, such as leakage or low fluid quantities. Furthermore, such systems have not been compensated for temperature changes in the fluid being monitored.

SUMMARY OF THE INVENTION

An object of the present invention is to provide a monitoring system for a vehicle hydraulic system wherein reliable warning signals are generated and misleading warning signals are prevented.

Another object of the present invention is to provide a vehicle hydraulic system monitor which prevents generation of warning signals due to low engine speed.

Another object of the present invention is to provide a temperature-compensated monitoring system for a vehicle hydraulic system.

Another object of the present invention is to provide an engine speed-compensated monitoring system for a vehicle hydraulic system.

These and other objects are achieved by the present invention which includes a pressure sensor and a temperature sensor exposed to the lubricating fluid in the hydraulic circuits in a hydraulic assist-type transmission (not shown). An engine speed sensor senses the vehicle engine speed. A pressure alarm value is calculated as a function of engine speed and fluid temperature. A warning device may be energized when the sensed pressure falls below and remains below the calculated alarm value for a certain time period.

DETAILED DESCRIPTION

Figure 1:
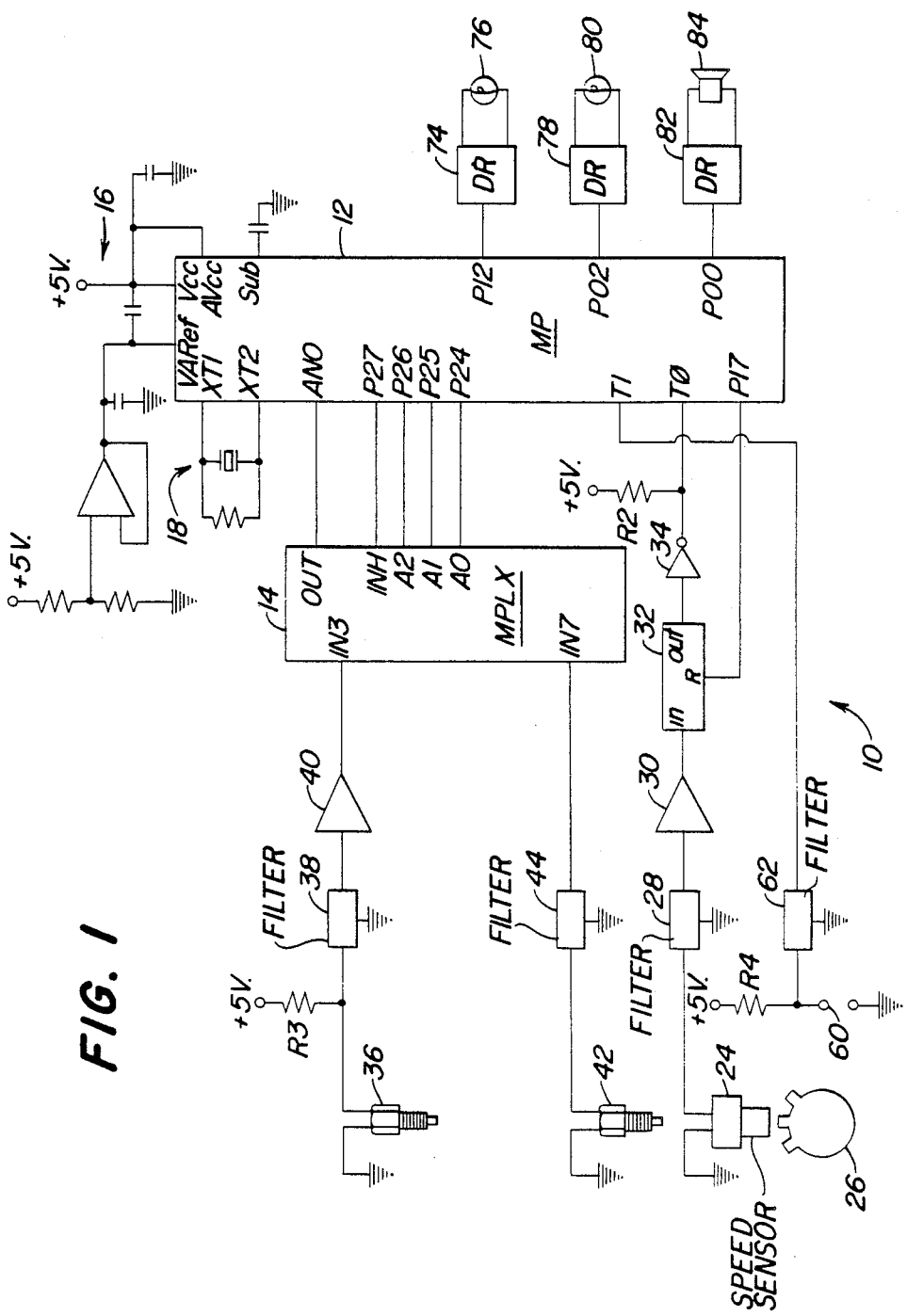
FIG. 1 is a schematic block diagram of a monitoring system constructed according to the present invention.

The monitoring system 10 includes a conventional microprocessor 12, such as Intel's 8022 A/D Converter and Microprocessor, coupled to a conventional 8-to-1 analog multiplexer 14, such as is available from National Semiconductor or Motorola. A regulating circuit 16 provides a regulated 4-volt reference voltage to the VARef input of the microprocessor 12 for use as a reference voltage in its internal A-to-D converter. A crystal circuit 18 provides a 3.6 MHz clock signal for the microprocessor 12.

An engine speed sensor 24, such as is available from Wabash Magnetics, is a sensing coil surrounding a permanent magnet positioned adjacent to a timing gear 26 of the vehicle engine (not shown). Sensor 24 generates a signal with a frequency proportional to the rpm of the vehicle engine. This signal is coupled to a TO input of the microprocessor 12 via electromagnetic interference (EMI) filter 28, Schmitt trigger 30, divide-by-10 counter 32 and inverter 34. A pull-up resistor R2 couples the output of inverter 34 to +5 volts. Data representing the engine speed is derived from sensor 24 and counter 32 in the following manner: A time interval is defined by the time required for consecutive pulses to be generated at the out terminal of the counter 32. This inverval is thus proportional to the time required for 10 pulses to be generated by sensor 24, and is therefore inversely proportional to the rotation speed of the timing gear 26 and of the engine. A value representing engine speed may then be obtained by applying appropriate scaling factors to the inverse of the time interval. As part of this procedure, the counter 32 periodically receives reset signals at its reset R input from the P17 terminal of the microprocessor 12, so that it can respond to further groups of 10 pulses from sensor 24. A hydraulic oil temperature sensor 36 is positioned in any convenient location in the hydraulic circuit of the hydraulic assist transmission (not shown), for example, in a line between the hydraulic oil cooler (not shown) and the transmission components to the lubricated (not shown). The temperature sensor 36 is coupled to input IN3 of multiplexer 14 via EMI filter 38, amplifier 40 and is coupled to +5 volts via pull-up resistor R3. The signal from transmission lube pressure sensor 42 is coupled to an input IN7 of multiplexer 14 via EMI filter 44.

A programming pin 60 is coupled to +5 volts via pull-up resistor R4 and is coupled to an input of the micro 12 via EMI filter 62. Output P12 of the micro is coupled to a lamp driver 74 and lamp 76, wherein lamp 76 is preferably identified as the "transmission lube pressure light". Output PO2 of the micro 12 is coupled to a similar driver and lamp 78 and 80, where the lamp 80 is preferably identified as the "stop engine light". Output P00 is coupled via driver 82 to an audible warning device, such as a horn 84. The indicating devices 72, 76, 80 and 84 are all preferably located in the vehicle operator's compartment (not shown). Pins P24–P27 of the micro 12 are addressing pins which are connected to corresponding addressing pins of the multiplexer 14.

Figure 2A:
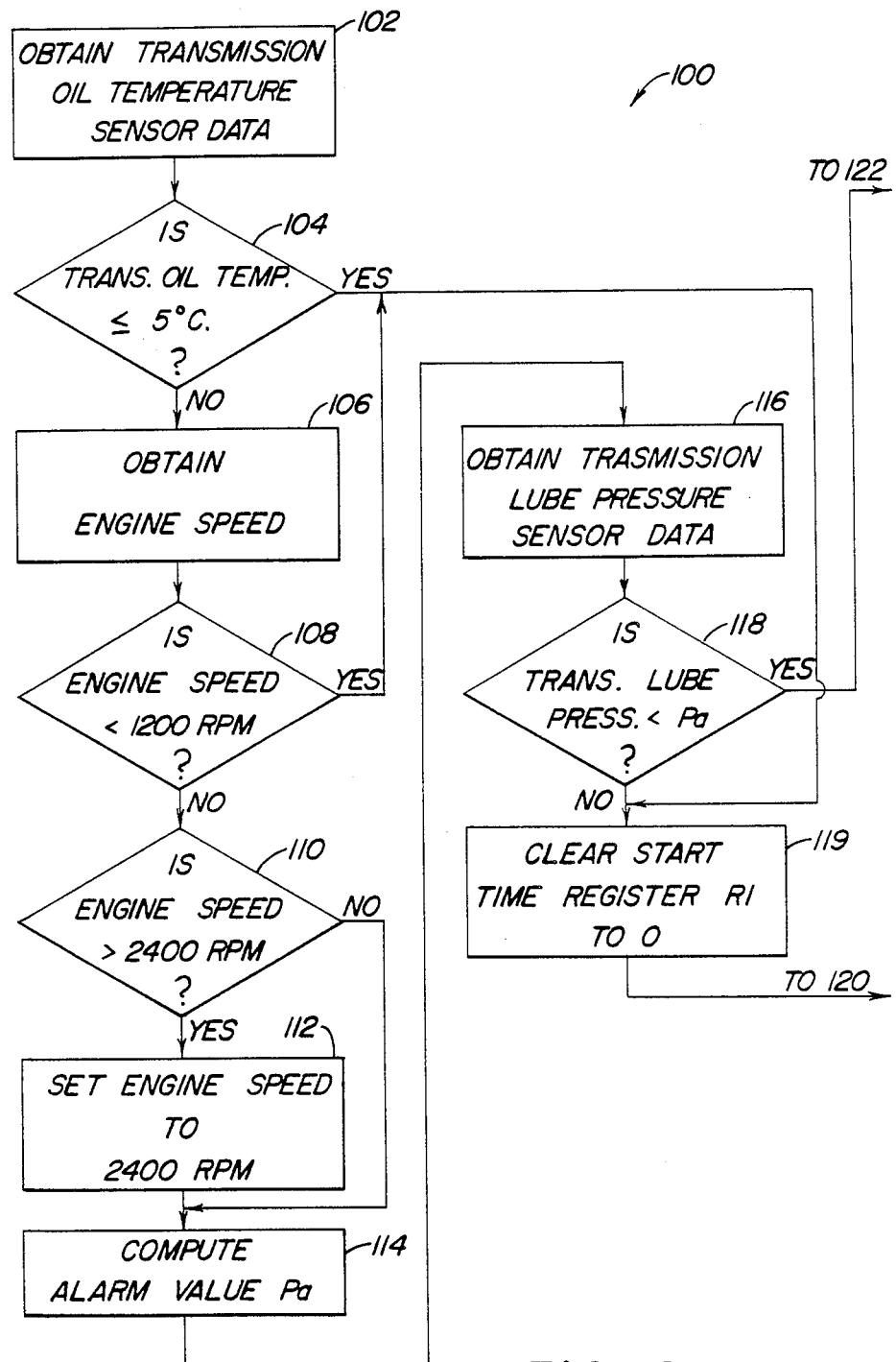
FIGS. 2a and 2b are flow charts illustrating the operational program contained in the microprocessor of the present invention.
Figure 2B:
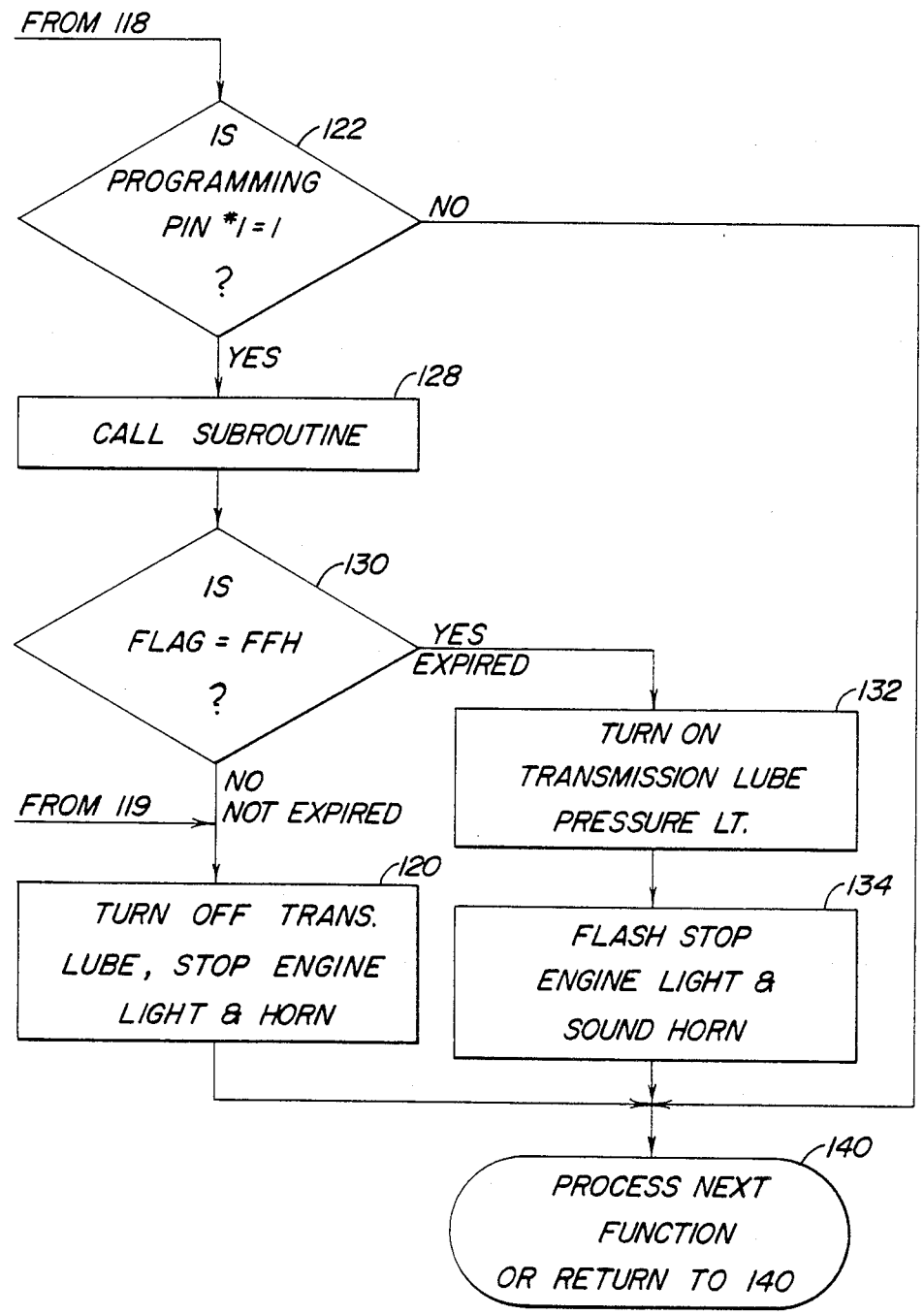

The monitoring system 10 performs a transmission lubricating pressure-monitoring function by carrying out an operational program 100 contained in the memory of the micro 12. Operational program 100 will be described with reference to the flow chart, shown in FIGS. 2a and 2b. The program 100 begins at step 102 where temperature data is obtained from the oil temperature sensor 36. This temperature data is then compared to a reference temperature of, for example, 5 degrees celsius in step 104. If the sensed temperature is less than or equal to the reference temperature, then the routine proceeds to step 119 where start time register is cleared or reset to 0, after which the routine proceeds to step 120, whereupon indicating devices 76, 80 and 84 are deactivated. After step 120, the routine returns to step 102 via step 140, or it may proceed to another routine. Step 119 operates to prevent generation of an alarm signal unless the failure conditions persist continuously for the desired duration period of, for example, 3.0 seconds. However, if the temperature is greater than 5 degrees celsius in step 104, then an engine speed value is obtained in step 106 from sensor 22.

In steps 108 and 110, the engine speed is compared to lower and upper values, such as 1200 and 2400 rpm, respectively. If the engine speed is less than 1200 rpm, the routine proceeds to previously described steps 119 and 120, otherwise, the routine proceeds to step 110. If, in step 110, the engine speed is not greater than 2400 rpm, then the routine proceeds to step 114. If the engine speed is greater than 2400 rpm, then the routine proceeds to step 112 where the engine speed value is assigned a value corresponding to 2400 rpm.

In step 114, a lube pressure alarm value, Pa is calculated according to the equation, $Pa = (0.06419 \times (\text{engine rpm})) - 0.5158 - (0.6757 \times (\text{transmission oil temp.}))$. Thus, the alarm value, Pa, is compensated for variations in the engine speed and in the transmission oil temperature. Next, in step 116, a transmission lube pressure value is obtained from sensor 42, for comparison in step 118 with the alarm value, Pa. If, in step 118, the sensed lube pressure is not less than the alarm value Pa, then the routine proceeds to previously describe steps 119 and 120. However, if the lube pressure is less than Pa, then the routine proceeds to step 122. Step 122, along with programming pin 60, permits this monitoring function to be bypassed, where desired, by grounding of pin 60.

Step 128 directs the main program to a duration subroutine 200 which will be described in detail later. Briefly, the duration subroutine 200 clears an accumulator (not shown), or sets a flag to zero if the desired duration period, in this case, 3.0 seconds, has not expired. If the desired duration period has expired, then the duration subroutine sets the flag to FFH, which is a hexidecimal term meaning all binary 1 values. Step 130 causes the main routine to proceed to previously described steps 120 and 140, if the 3.0 second duration period has not expired. Step 130 directs the routine to steps 132–134 and 140 if the 3.0 second duration period has expired, whereupon the transmission lube pressure warning light 76 is turned on. In this manner, the warning devices are actuated only if the engine speed remains greater than 1200 rpm and the sensed lube pressure remains less than the alarm value, Pa, for at least 3.0 seconds. The 3.0 second lube pressure duration period is chosen to account for temporary aberrations in normal lube operating pressures under various conditions of operation in 4-wheel drive tractors. Next, in step 134, the stop engine light 80 is flashed and the horn 84 is energized.

Figure 3:
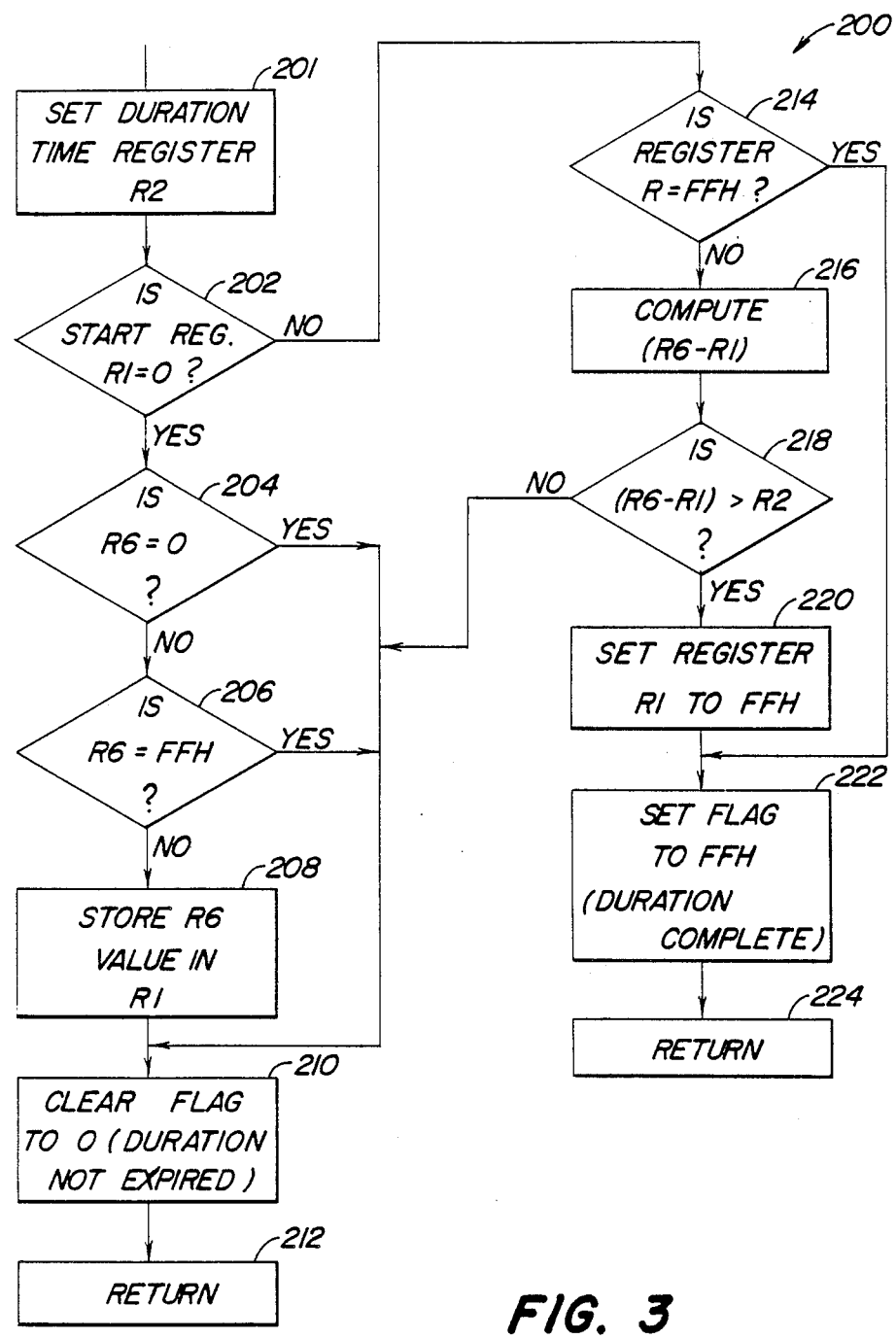
FIG. 3 is a flow chart of a subroutine used in the present invention.

Duration subroutine 200 will now be described in detail with reference to the flow chart illustrated in FIG. 3. First, step 201 sets a duration time register R2 (not shown) to a value which represents the desired 3.0 second duration period. Different duration periods can be obtained by changing the value set in register R2. Next, the contents of the duration start time register R1 (not shown) is compared to 0. If register R1 contains a 0, as would be the case if R1 were previously cleared by step 119 of the main program, then step 202 directs the subroutine to step 204. Otherwise, step 202 directs the subroutine to later described step 214.

In step 204, the contents of a current time register R6 is examined. The current time register R6 is incremented periodically so that its contents represents the passage of time. If R6=0, then step 204 directs the subroutine to steps 210 and 212 where the flag is cleared to 0 to represent that the duration period has not expired, after which the subroutine returns to step 130 of the main program. Similarly, step 206 directs the subroutine to steps 210 and 212 of the subroutine and step 130 of the main program, if R6=FFH. Thus, steps 204 and 206 operate to prevent generation of warning signals during system start-up or when the current time register R6 overflows to FFH.

If current time register R6 contains neither 0 nor FFH, then the subroutine proceeds to step 208 where the contents of the current time register R6 is stored in the duration start time register R1 so that now the duration start time register R1 will contain a value which represents when the duration subroutine began. Following step 208, the subroutine proceeds to previously described steps 210, 212 and 130, and no warning signals are generated.

Now, register R1 contains a non-zero number supplied by current time register R6. Therefore, if the failure conditions persist, the main program will return once again to the duration subroutine 200 whereupon step 202 will now direct the subroutine to step 214. Step 214 will direct the subroutine to step 216, unless the duration start time register R1 has been previously set to FFH by later described step 220.

In step 216, the elapsed time since the duration period began running is calculated by subtracting the contents of the duration start time register R1 from the contents of the current time register R6. Then, in step 218, this difference (R6−R1) is compared to the contents of the duration time register R2, which represents the desired duration period of 3.0 seconds. If (R6−R1) is less than R2, then the duration period has not expired and the subroutine is directed to previously described steps 210 and 212 and no warning signal is generated. However, if the duration period has expired, then (R6−R1) will be equal to or greater than R2 and the subroutine will proceed to step 220 where the duration start time register R1 is set to FFH, and step 222 where the accumulator is set to FFH to indicate that the duration period has expired. Step 224 will then cause a return to step 130 of the main program which directs the program to steps 132 and 134 whereupon the warning signals are generated. Note that once the duration period has expired and R1 is set to FFH by step 220, then upon subsequent passes through the subroutine, steps 202 and 214 will redirect the subroutine to steps 222 and 224 so that the warning signals will continue to be generated as long as the failure conditions persist.

Thus, with the foregoing program 100, and delay subroutine 200, the monitoring system 10 generates warning signals when the transmission lube pressure is below the alarm value, Pa. However, to prevent the generation of misleading warning signals, the warning devices are disabled if the transmission oil temperature is extremely cold, or if the engine speed is less than 1200 rpm, as during engine cranking or start-up. Furthermore, the alarms are disabled if the low pressure condition does not persist for at least a predetermined time to prevent generation of misleading warning signals while the hydraulic pressures are building up after the engine has been started or due to temporary aberrations during various operating conditions. Finally, to increase the accuracy of operation, the pressure alarm level, Pa, is adjusted or compensated as a function of the engine speed and of the oil temperature.

The conversion of the above flow charts into a standard language for implementing the algorithm described by the flow charts in a digital data processor, such as the microprocessor 12, will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In an engine-driven vehicle having a hydraulic assist transmission including a control fluid circuit and a lubricating fluid circuit, a monitoring system comprising:

an engine speed sensor;

a lubricating fluid pressure sensor;

a lubricating fluid temperature sensor; stored program means responsive to the engine speed, pressure and temperature sensors for periodically executing an algorithm comprising the steps of:
  (a) comparing the sensed fluid temperature to a threshold temperature and preventing generation of a warning signal if the sensed temperature is below said threshold temperature;
  (b) comparing the sensed engine speed to a low speed value and preventing generation of a warning signal if the sensed speed is below said low speed value;
  (c) comparing the sensed engine speed to a high speed value;
  (d) if the sensed speed is less than the high speed value, then computing an alarm value, Pa, as a function of the sensed engine speed and of the sensed fluid temperature;
  (e) if the sensed engine speed is greater than the high speed value, computing the alarm value, Pa, as a function of the high speed value and the sensed fluid temperature;
  (f) comparing the sensed fluid pressure to the computed alarm value, Pa, and generating a warning signal if the sensed pressure remains below the alarm value, Pa, for at least a predetermined time period; and an alarm means for generating an operator-detectable alarm signal in response to generation of the warning signal.

2. The monitoring system of claim 1, wherein the function of step "(d)" is defined by the equation:

$$Pa = (A \times (\text{sensed engine speed}) - B - (C \times (\text{sensed fluid temperature})),$$

where A, B and C are predetermined constants.

* * * * *